(12) United States Patent
Sandy et al.

(10) Patent No.: US 7,120,725 B2
(45) Date of Patent: Oct. 10, 2006

(54) METHOD OF COMMUNICATING A VMEBUS SIGNAL OVER IP PACKET NETWORK

(75) Inventors: Douglas L. Sandy, Chandler, AZ (US); Jeffrey M. Harris, Chandler, AZ (US); Robert C. Tufford, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 10/996,891

(22) Filed: Nov. 23, 2004

(65) Prior Publication Data
US 2006/0112186 A1 May 25, 2006

(51) Int. Cl.
G06F 13/38 (2006.01)

(52) U.S. Cl. ............... 710/314; 710/313; 710/315; 709/238

(58) Field of Classification Search ........ 710/305–317, 710/29–39, 60–63; 709/217–219, 227–229, 709/238–240, 248–250
See application file for complete search history.

(56) References Cited

U.S. PATENT DOCUMENTS

| 5,544,162 | A | * | 8/1996 | Mraz et al. ............. 370/401 |
| 6,151,318 | A | | 11/2000 | Woodward et al. |
| 6,393,033 | B1 | | 5/2002 | Woodward et al. |
| 6,625,169 | B1 | * | 9/2003 | Tofano .................. 370/466 |
| 6,654,355 | B1 | * | 11/2003 | Marbach et al. ........... 370/285 |
| 6,662,254 | B1 | * | 12/2003 | Tal et al. ................. 710/300 |
| 6,895,461 | B1 | * | 5/2005 | Thompson ............... 710/305 |
| 6,985,991 | B1 | * | 1/2006 | Harris et al. ............. 710/306 |
| 2003/0012190 | A1 | | 1/2003 | Kaku et al. |
| 2003/0219015 | A1 | | 11/2003 | Six et al. |
| 2004/0013118 | A1 | | 1/2004 | Borella |
| 2004/0172479 | A1 | | 9/2004 | Ksinant et al. |
| 2004/0172494 | A1 | | 9/2004 | Pettey et al. |
| 2005/0256989 | A1 | * | 11/2005 | Wolfe et al. .............. 710/306 |

* cited by examiner

Primary Examiner—Mark H. Rinehart
Assistant Examiner—Raymond N Phan
(74) Attorney, Agent, or Firm—Kevin D. Wills

(57) ABSTRACT

A method of communicating a VMEbus transfer (235) from an initiator VMEbus domain (202) over an IP packet network (210) to a responder VMEbus domain (204) can include the initiator VMEbus domain creating the VMEbus transfer and reading a VMEbus destination address (452) of the VMEbus transfer. The VMEbus destination address can be mapped to a responder VMEbus domain IP address and the VMEbus transfer encapsulated in an IP packet (236). The IP packet can be communicated to the responder VMEbus domain over the IP packet network.

18 Claims, 4 Drawing Sheets

METHOD OF COMMUNICATING A VMEBUS SIGNAL OVER IP PACKET NETWORK

BACKGROUND OF THE INVENTION

In current high-speed data networks, such as parallel multi-drop bus networks using VERSAmodule Eurocard (VMEbus) protocols, signal integrity and maximum transfer speeds are limited by the number of slots occupied by payload cards, the distance between payload cards, signal degradation on the parallel bus, and the like. Due to the myriad of factors affecting signal integrity on the parallel bus, it is difficult to extend VMEbus network beyond a short distance, such as a single chassis. In addition, improvements in protocols used on VMEbus networks are too costly, and just cannot meet the rapidly increasing bandwidth demands over the next few years.

Internet Protocol (IP) is the world's most popular open-system (nonproprietary) protocol suite because it can be used to communicate across any set of interconnected networks and is equally well suited for LAN and WAN communications. While VMEbus will remain common in embedded, local network applications, IP will likely remain the network standard for external networks such as the Internet. The prior art does not provide a means to transport VMEbus transfers over the ubiquitous IP network. This has the disadvantage in limiting the venerable VMEbus to use in single chassis and smaller networks.

Accordingly, there is a significant need for an apparatus and method that overcomes the deficiencies of the prior art outlined above.

BRIEF DESCRIPTION OF THE DRAWINGS

Referring to the drawing.

Figure 1:
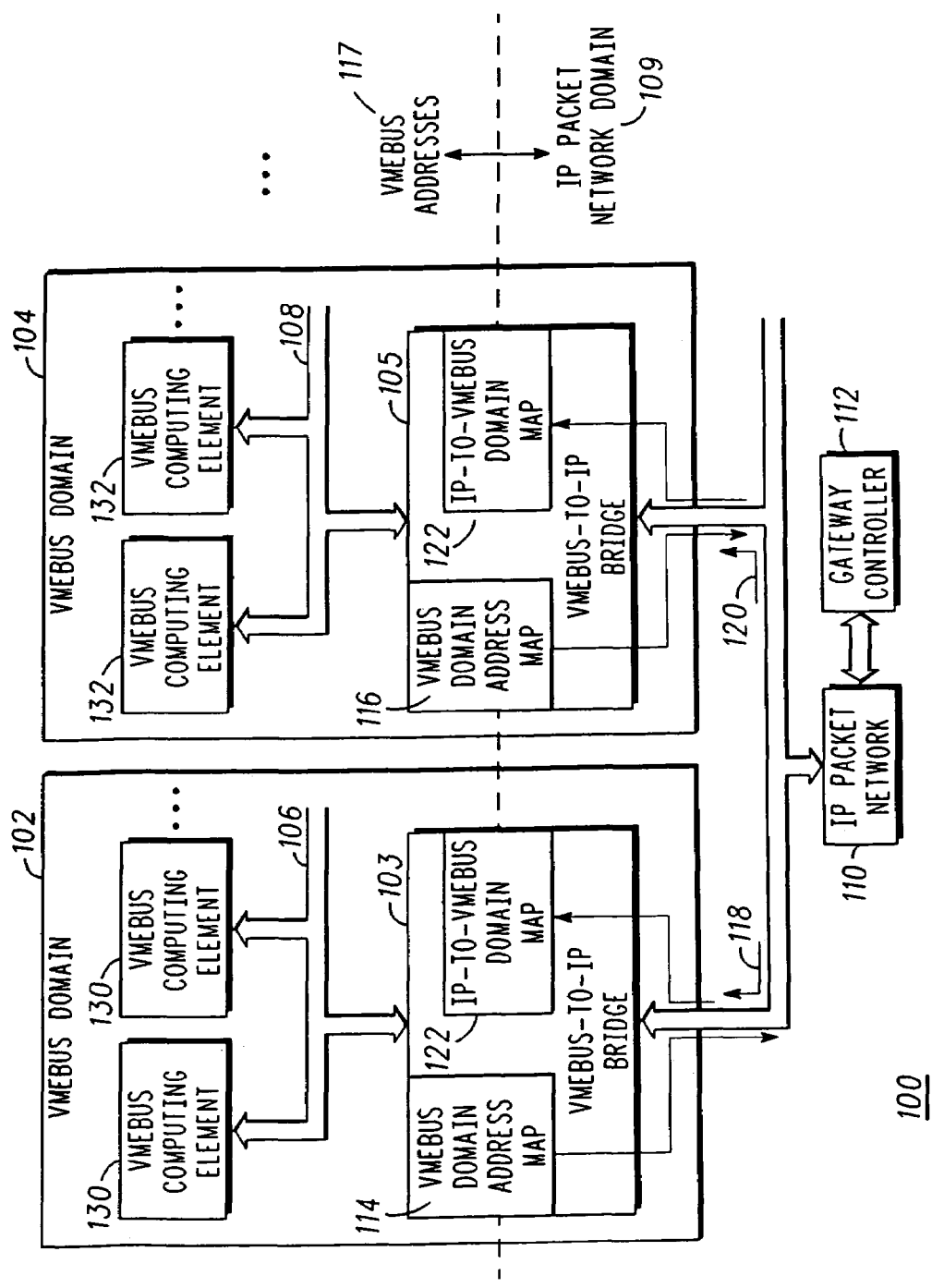
FIG. 1 depicts a computer network according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a computer network 100 according to one embodiment of the invention. Computer network 100 can include an IP packet network 110 coupled to a gateway controller 112. IP packet network 110 can operate using a suite of communication protocols known in the art, of which the two best known are the Transmission Control Protocol (TCP) and the Internet Protocol (IP). The Internet protocol suite not only includes lower-layer protocols (such as TCP and IP), but can also specify common applications such as electronic mail, terminal emulation, and file transfer.

The Internet Protocol is a network-layer protocol that contains addressing information and some control information that enables packets to be routed. IP is the primary network-layer protocol in the Internet protocol suite. Along with the Transmission Control Protocol, IP represents the heart of the Internet protocols. IP has two primary responsibilities: providing connectionless, best-effort delivery of packets through an internetwork of nodes; and providing fragmentation and reassembly of packets to support data links with different maximum-transmission unit (MTU) sizes.

Gateway controller 112 can be used to allow individual nodes coupled to IP packet network 110 to extract their configurations. In other words, individual nodes coupled to IP packet network 110 can extract their configuration from gateway controller 112. In an example, gateway controller 112 may not have any information on an individual node coupled to IP packet network 110 until that individual node requests information. An example of gateway controller 112 can be a Dynamic Host Configuration Protocol (DHCP) server. DHCP is an Internet protocol for automating the configuration of computers that use TCP/IP. DHCP can be used to automatically assign IP addresses, to deliver TCP/IP stack configuration parameters such as the subnet mask and default router, and to provide other configuration information for example addresses for printer, time and news servers.

VMEbus as known in the art, can be implemented as a master/slave architecture that uses an asynchronous bus with a variable speed handshaking protocol. VMEbus is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus parallel multi-drop protocols can include, but are not limited to, Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST).

Computer network 100 can include any number of VMEbus domains 102, 104 coupled to IP packet network 110. By way of example, VMEbus domain 102 can include any number of boards, chassis, networks or systems that include one or more VMEbus computing elements 130 coupled by a VMEbus network 106. VMEbus network 106 is known in the art and can include an asynchronous bus operating a VMEbus protocol.

VMEbus computing element 130 can include, but is not limited to, a processor, memory device, storage device, wireline or wireless communication device, and the like. For example, VMEbus computing element 130 can be a blade in a VMEbus chassis that interfaces with VMEbus network 106. VMEbus computing element 130, can be for example and without limitation, a VMEbus blade with one or more processors operating using a PCI or PCI-X bus network as is known in the art. VMEbus computing element 130 is coupled to communicate on VMEbus network 106 using VMEbus transfers generated and propagated using any VMEbus protocol. In an embodiment, each VMEbus computing element 130 is coupled to VMEbus network 106. In an embodiment, VMEbus network 106 is coupled to VMEbus-to-IP bridge 103 which can function to encapsulate and de-encapsulate VMEbus transfers in and out of IP packets as explained more fully below.

In an embodiment, computer network 100 can include a plurality of VMEbus addresses 117, which are only recognizable and readable within a VMEbus domain 102, 104 operating a VMEbus network 106, 108. VMEbus addresses 117 can each include, for example and without limitation, one or more memory address spaces as is known in the art. For example, plurality of VMEbus addresses 117 may only be recognizable and relevant to VMEbus computing elements 130 coupled to VMEbus network 106 on VMEbus domain 102 as they reference one or more unique memory address-spaces. Also, VMEbus domain 104 can have a set of VMEbus addresses relevant to VMEbus computing elements 132 coupled to VMEbus network 108.

In an embodiment, computer network 100 can also include IP packet network domain 109 comprising a plurality of nodes having IP addresses. Plurality of IP addresses are recognizable and relevant on IP packet network 110 within computer network 100.

Although VMEbus addresses 117 can be used to specify a destination address for a VMEbus transfer going from one VMEbus domain 102 to another VMEbus domain 104, these VMEbus addresses 117 are not recognizable to IP packet network 110. Therefore, any VMEbus transfer addressed from one VMEbus domain 102 to another VMEbus domain 104 cannot travel over IP packet network 110 by itself.

In an embodiment, VMEbus domain 102 can include VMEbus-to-IP bridge 103 coupled to VMEbus network 106 and to IP packet network 110. In an embodiment, VMEbus-to-IP bridge 103 can include any combination of hardware, software, and the like. VMEbus-to-IP bridge 103 can function to encapsulate a VMEbus transfer into an IP packet for transport over IP packet network 110. VMEbus-to-IP bridge 103 can also function to de-encapsulate a VMEbus transfer from an IP packet so the VMEbus transfer can be communicated over VMEbus network 106.

VMEbus domain 104 can also include any number of VMEbus computing elements 132 coupled by VMEbus network 108. VMEbus domain 104 can also include, VMEbus-to-IP bridge 105 that functions to encapsulate and de-encapsulate a VMEbus transfer in a manner analogous to that described with reference to VMEbus-to-IP bridge 103 in VMEbus domain 102.

An exemplary embodiment of a method of initializing computer network 100 is depicted in FIG. 1. In an embodiment, upon power-up or boot-up of computer network 100, VMEbus domain 102 determines a VMEbus domain address map 114, which can be for example a list of all VMEbus addresses of each of the VMEbus computing elements 130 in VMEbus domain 102. In an embodiment, VMEbus domain address map 114 can be a list of the VMEbus addresses of all VMEbus computing elements 130 capable of sending, receiving, and the like, a VMEbus transfer. The same procedure can be repeated for VMEbus domain 104 which can generate VMEbus domain address map 116 in an analogous manner.

In an embodiment, also upon power-up or boot-up of computer network 100, each VMEbus domain 102, 104 can request and receive from gateway controller 112, an IP address 118, 120. For example, VMEbus domain 102 can request IP address 118 and VMEbus domain 104 can request IP address 120. Each IP address for each VMEbus domain in computer network 100 can be unique so as to uniquely identify each VMEbus domain on IP packet network 110. As is known in the art, an IP address can be used to uniquely identify a node that is making use of IP packet network 110. The IP address can be used by the IP packet network 110 to direct data to each VMEbus domain 102, 104. In one embodiment, it can be the task of gateway controller 112 to get a functional and unique IP address to each VMEbus domain 102, 104 that makes use of IP packet network 110. In another embodiment, gateway controller 112 does not assign IP addresses as IP addresses for each of VMEbus domains 102, 104 can be static or determined at the VMEbus domain itself.

In an embodiment, gateway controller 112 can query each VMEbus domain in computer network 100 to communicate its VMEbus domain address map. For example, gateway controller 112 can determine if a node in computer network 100 is a VMEbus domain. If it is, then gateway controller 112 can request that the VMEbus domain communicate its VMEbus domain address map. For example, gateway controller 112 can query VMEbus domain 102 to communicate VMEbus domain address map 114 to gateway controller 112. Also, VMEbus domain 104 can be queried and send VMEbus domain address map 116 to gateway controller 112.

Upon receipt of all VMEbus domain address maps from VMEbus domains in computer network 100, gateway controller 112 can build an IP-to-VMEbus domain address map 122. In an embodiment IP-to-VMEbus domain map 122 corresponds each VMEbus address 117 to an IP address 118, 120 where the VMEbus computing element 130; 132 resides. For example, IP-to-VMEbus domain map 122 can match IP address 118 for VMEbus domain 102 to the VMEbus address 117 for each VMEbus computing element 130 in VMEbus domain 102. Also, IP-to-VMEbus domain map 122 can match IP address 120 for VMEbus domain 104 to the VMEbus address 117 for each VMEbus computing element 132 on VMEbus domain 104. In an embodiment, IP-to-VMEbus domain map 122 can correlate an IP address of a VMEbus domain to a VMEbus address and memory size for that VMEbus domain.

In an embodiment, after gateway controller 112 builds IP-to-VMEbus domain address map 122, gateway controller 112 can communicate IP-to-VMEbus domain map 122 to each VMEbus domain 102, 104 in computer network 100.

For example, gateway controller 112 can communicate IP-to-VMEbus domain map 122 to VMEbus-to-IP bridge 103 on VMEbus domain 102, and to VMEbus-to-IP bridge 105 on VMEbus domain 104.

The invention is not limited to computer networks having only VMEbus domains. Computer network 100 can include other nodes coupled to IP packet network 110 that function using another protocol besides VMEbus.

Figure 2:
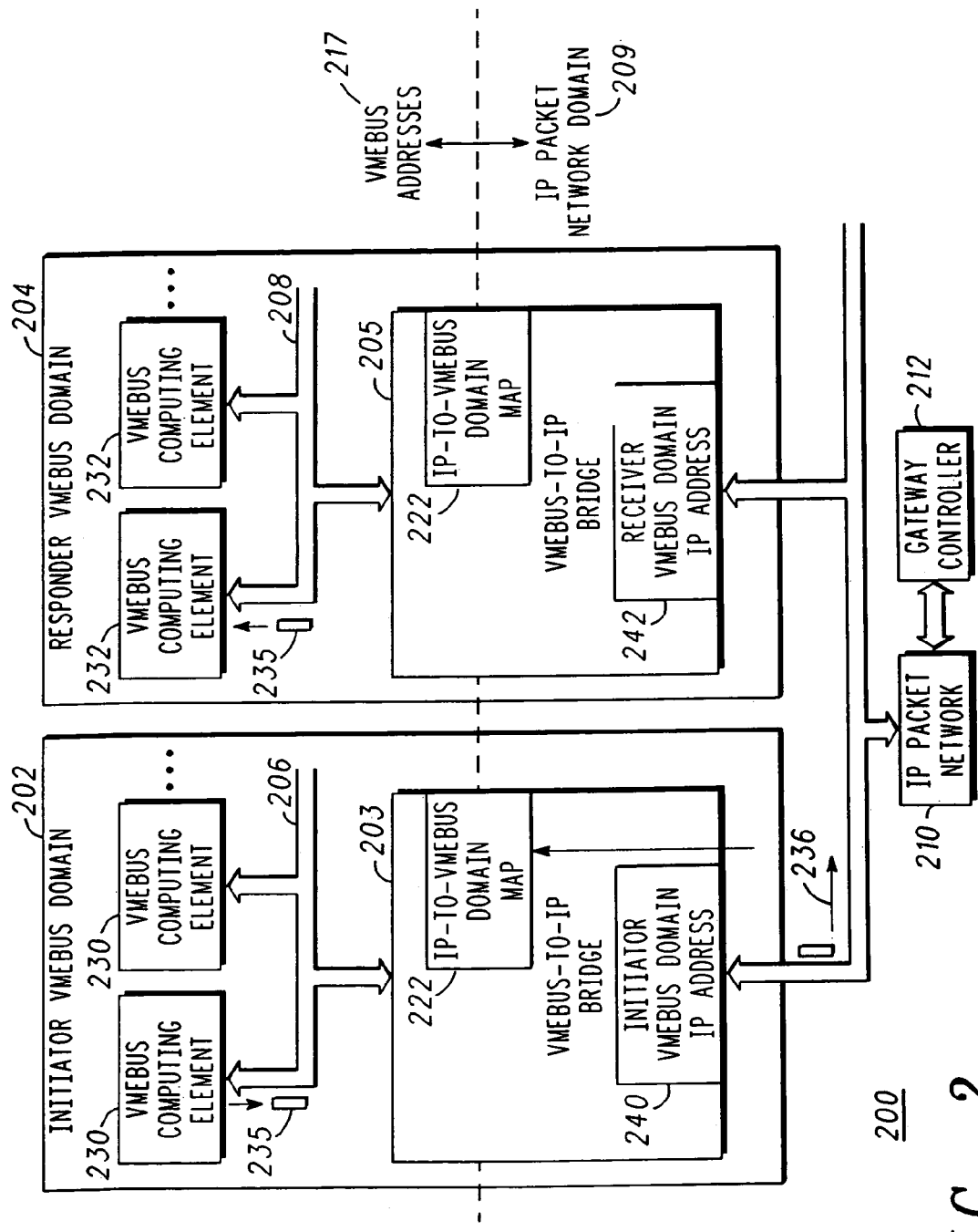
FIG. 2 depicts a computer network according to another embodiment of the invention.

FIG. 2 depicts a computer network 200 according to another embodiment of the invention. In an embodiment, the computer network 200 of FIG. 2 depicts a method of communicating a VMEbus transfer 235 from an initiator VMEbus domain 202 to a responder VMEbus domain 204 over an IP packet network 210. Computer network 200 can include VMEbus addresses 217 in each of the VMEbus domains, and IP packet network domain 209 with IP addresses as discussed above with reference to FIG. 1.

As shown in FIG. 2, computer network 200 can include IP packet network 210 coupled to initiator VMEbus domain 202 and responder VMEbus domain 204. Initiator VMEbus domain 202 can include one or more VMEbus computing elements 230. VMEbus computing element 230 can include, but is not limited to, a processor, memory device, storage device, wireline or wireless communication device, and the like. VMEbus computing element 230 is coupled to communicate on VMEbus network 206 using VMEbus transfer 235.

VMEbus network 206 is coupled to VMEbus-to-IP bridge 203, which is coupled to encapsulate a VMEbus transfer 235 into an IP packet 236 for transport over IP packet network 210. VMEbus-to-IP bridge 203 can also function to de-encapsulate a VMEbus transfer 235 from an IP packet 236 so the VMEbus transfer 235 can be communicated over VMEbus network 206.

Responder VMEbus domain 204 can include one or more VMEbus computing elements 232. VMEbus computing element 232 is coupled to communicate on VMEbus network 208 using VMEbus transfer 235. VMEbus network 208 is coupled to VMEbus-to-IP bridge 205, which is coupled to encapsulate a VMEbus transfer 235 into an IP packet 236 for transport over IP packet network 210. VMEbus-to-IP bridge 205 can also function to de-encapsulate a VMEbus transfer 235 from an IP packet 236 so the VMEbus transfer 235 can be communicated over VMEbus network 208.

As described with reference to FIG. 1, an initiator VMEbus domain IP address 240 can be communicated to initiator VMEbus domain 202 from gateway controller 212 or otherwise statically determined. Also, responder VMEbus domain IP address 242 can be communicated to responder VMEbus domain 204 from gateway controller 212 or otherwise statically determined. Further, as described with reference to FIG. 1, IP-to-VMEbus domain map 222 can be determined and communicated to both initiator VMEbus domain 202 and responder VMEbus domain 204.

In an embodiment, VMEbus computing element 230 at initiator VMEbus domain 202 can create VMEbus transfer 235. In an embodiment, VMEbus transfer 235 can include any transfer addressed to another VMEbus computing element. If VMEbus transfer 235 is addressed to computing element 232 in responder VMEbus domain 204, then VMEbus transfer 235 is required to traverse IP packet network 210 as shown in FIG. 2.

VMEbus transfer 235 can be communicated over VMEbus network 206 at initiator VMEbus domain 202 to VMEbus-to-IP bridge 203, where the VMEbus destination address is read. In an embodiment, VMEbus-to-IP bridge 203 can use IP-to-VMEbus domain map 222 to map the VMEbus destination address to responder VMEbus domain IP address 242. In an embodiment, responder VMEbus domain IP address 242 can be included in a header of the IP packet 236. In a further embodiment, VMEbus-to-IP bridge 203 of initiator VMEbus domain 202 can examine VMEbus transfer 235 to determine at least one VMEbus protocol flag to include in the IP packet 236. For example, the protocol used in VMEbus transfer 235 can be determined and placed in IP packet 236 as a VMEbus protocol flag. In accordance with mapping, VMEbus transfer 235 can be encapsulated in an IP packet 236, where IP packet 236 is communicated to responder VMEbus domain 204 over IP packet network 210.

In an embodiment, upon receipt of IP packet 236 at responder VMEbus domain 204, VMEbus-to-IP bridge 205 can de-encapsulate VMEbus transfer 235 from IP packet 236. Thereafter, VMEbus transfer 235 can be issued via VMEbus network 208 to VMEbus computing element 232 corresponding to the VMEbus destination address 217.

Figure 3:
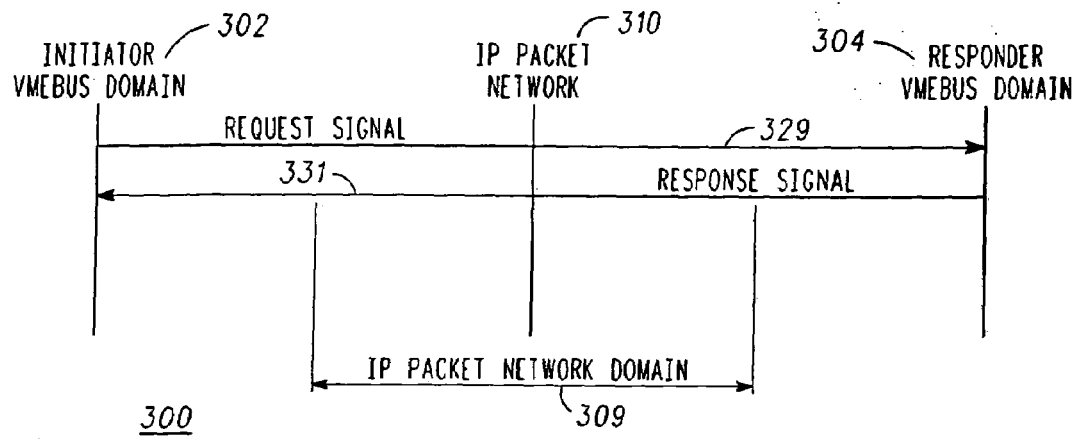
FIG. 3 depicts a ladder diagram illustrating an embodiment of the invention.

FIG. 3 depicts a ladder diagram illustrating an embodiment of the invention. In an embodiment, initiator VMEbus domain 302 can initiate a read request, write data, control transfer, and the like, to responder VMEbus domain 304. Read, write and control transfers are known in the art and can include any type of electronic transfer that is understandable by responder VMEbus domain 304.

In an embodiment, a VMEbus computing element at initiator VMEbus domain 302 can initiate communication with responder VMEbus domain 304 using a compelled (i.e. handshake) signaling process. The compelled (handshake) signaling process can be used with any VMEbus protocol. VMEbus transfer 235 can include any transfer sent from one VMEbus computing element to another VMEbus computing element. As shown in FIG. 3, the compelled signaling process can begin with initiator VMEbus domain 302 initiating communication with responder VMEbus domain 304 by sending request signal 329, which can include the address of the targeted VMEbus computing element at responder VMEbus domain 304, protocol to be used, and the like. In an embodiment, the protocol to be used for data transfer can be indicated using extended address modifier (XAM) code. XAM code is known in the art. In an embodiment, the VMEbus transaction can be a write transaction, where request signal 329 can include data to be written from initiator VMEbus domain 302 to responder VMEbus domain 304. If the VMEbus computing element at responder VMEbus domain 304 recognizes request signal 329, responder VMEbus domain 304 can communicate response signal 331 back to initiator VMEbus domain 302 to indicate that data has been written. Response signal 331 can also include a bus busy indication or an error indication as is known in the art.

In another embodiment, the VMEbus transaction can be a read request transaction, where request signal 329 includes a request to read data from responder VMEbus domain 304. In this embodiment, response signal 331 can include data read from responder VMEbus domain 304 that is being communicated to initiator VMEbus domain 302. Response signal 331 can also include a bus busy indication or an error indication as is known in the art.

In an embodiment, each of the aforementioned signals, request signal 329 or response signal 331 can be considered a VMEbus transfer 235 as each are a communication from one VMEbus computing element to another VMEbus computing element or from one VMEbus domain to another VMEbus domain.

Request signal 329 and response signal 331 together can represent one VMEbus transaction. Other types of VMEbus transfers or communication signals can be included in a VMEbus transaction and be within the scope of the invention. Request signal 329 and response signal 331 can be repeated as often as necessary to read or write desired data from one VMEbus domain to another VMEbus domain and be within the scope of the invention.

As shown in FIG. 3, when going from one VMEbus domain to another VMEbus domain, VMEbus transfers 235 can traverse IP packet network 310 and IP packet network domain 309. VMEbus transfers 235 cannot by themselves traverse IP packet network 310 or IP packet network domain 309. Therefore, encapsulating and de-encapsulating VMEbus transfers 235 as described above can be used to communicate VMEbus transfer 235 from initiator VMEbus domain 302 to responder VMEbus domain 304 over IP packet network 310.

Figure 4:
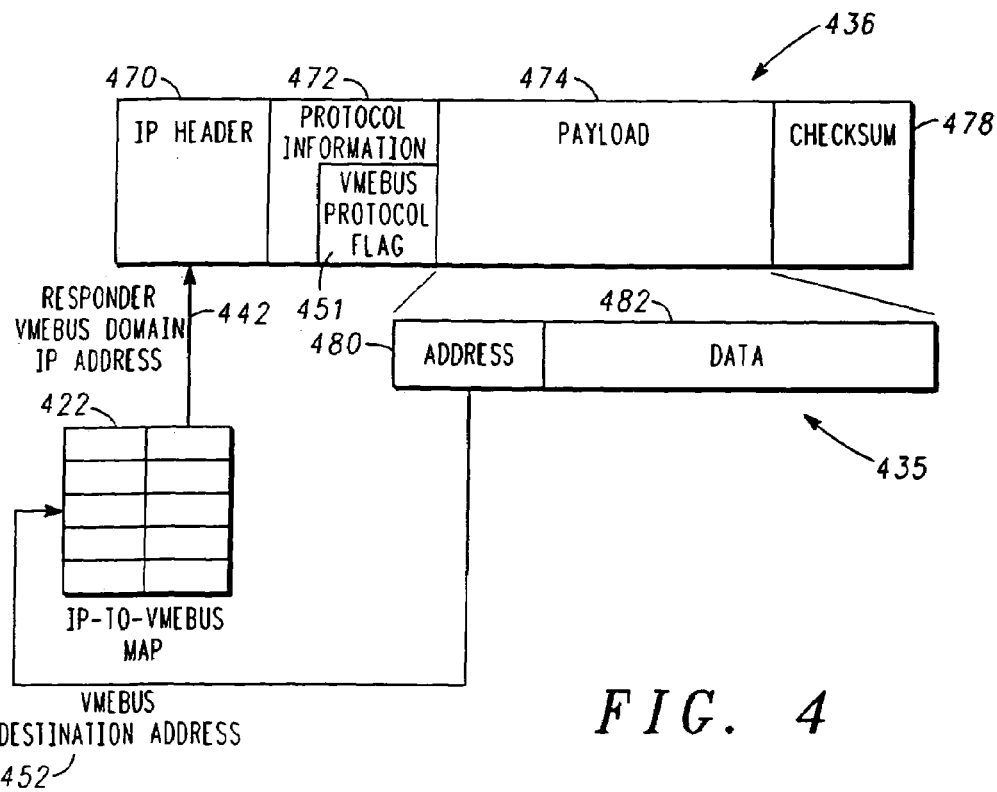
FIG. 4 depicts a VMEbus transfer encapsulated into an IP packet according to an embodiment of the invention.

FIG. 4 depicts a VMEbus transfer 435 encapsulated into an IP packet 436 according to an embodiment of the invention. In general, individual fields of an IP packet 436 are known in the art. The IP header 470 can include things such as the destination IP address, source address, packet length, and the like. Protocol information 472 can include a VMEbus protocol flag 451 used to indicate what VMEbus protocol is being used in VMEbus transfer, VMEbus protocol version, and the like, including what upper layer protocol is to receive incoming packets after IP processing. Payload 474 can include any data in IP packet 436 and can include encapsulated transfers, for example VMEbus transfer 435. Checksum 478 can ensure packet integrity.

VMEbus transfer 435 can include address field 480, which can include VMEbus destination address 452, protocol to be used and the like. For example, address field 480 can include data from a VMEbus address encoding table as is known in the art. For example, VMEbus address encoding table can include the geographic address, slot number of a VMEbus computing element, and the like. In an embodiment, address field can include any data to address VMEbus transfer 435. Data field 482 can include the data being transported by VMEbus transfer 435.

In an embodiment, VMEbus transfer 435 can be created by a VMEbus computing element in an initiator VMEbus domain as described above. In one embodiment, VMEbus transfer 435 can include a VMEbus destination address 452 in address field 480. In an embodiment, VMEbus-to-IP bridge can include IP-to-VMEbus domain map 422 to map VMEbus destination address 452 to responder VMEbus domain IP address 442. In an embodiment, responder VMEbus domain IP address 442 can be placed in IP header 470 such that IP packet 436 is addressed to responder VMEbus domain corresponding with VMEbus destination address 452. In other words, IP packet 436 can be addressed to responder VMEbus domain having VMEbus computing element to which VMEbus transfer 435 is destined. VMEbus transfer 435 can then be encapsulated in payload portion 474 of IP packet 436 as shown in FIG. 4.

When IP packet 436 arrives at responder VMEbus domain, the reverse of the above process can occur. For example, VMEbus-to-IP bridge at responder VMEbus domain can de-encapsulate VMEbus transfer 435. Thereafter, VMEbus transfer 435 can be communicated over VMEbus network to VMEbus computing element.

Figure 5:
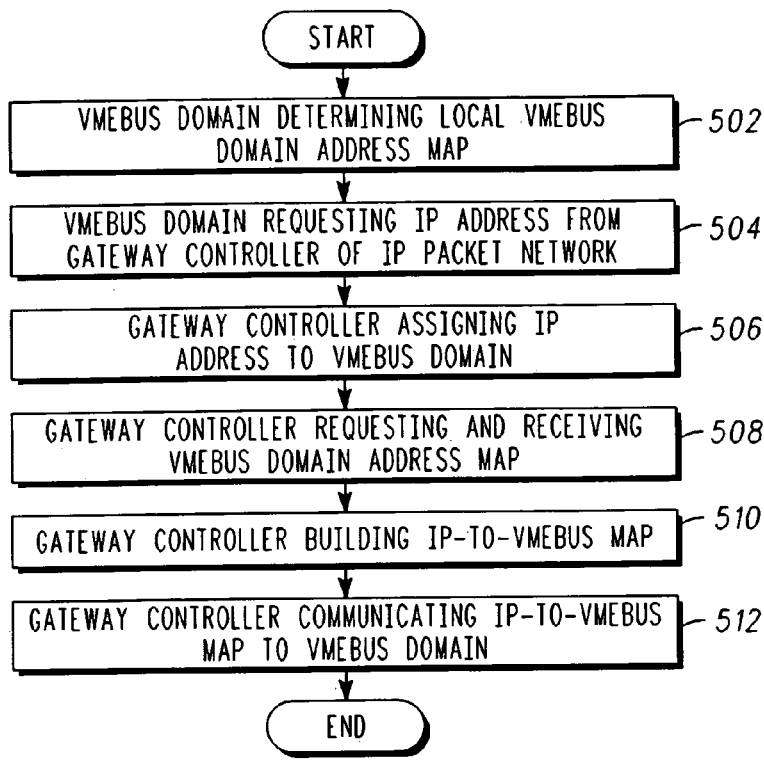
FIG. 5 illustrates a flow diagram of a method of the invention according to an embodiment of the invention.

FIG. 5 illustrates a flow diagram 500 of a method of the invention according to an embodiment of the invention. In an embodiment, FIG. 5 sets forth a method of initializing a computer network. In step 502, a VMEbus domain determines a VMEbus domain address map for the VMEbus computing elements at VMEbus domain. In step 504, VMEbus domain requests an IP address from gateway controller of an IP packet network. In step 506, gateway controller issues an IP address to VMEbus domain. Optionally, steps 504 and 506 can be replaced with the step of the VMEbus domain generating its own static IP address or receiving an IP address from another source.

In step 508, gateway controller can request and receive VMEbus domain address map from VMEbus domain. Gateway controller can first determine if a node coupled to IP packet network is a VMEbus domain before requesting VMEbus domain address map. In step 510, gateway controller can build an IP-to-VMEbus domain map based on the VMEbus domain address map. In step 512, gateway controller can communicate IP-to-VMEbus domain map to VMEbus domain. The above steps illustrated in FIG. 5 can occur for any number of VMEbus domains coupled to IP packet network.

Figure 6:
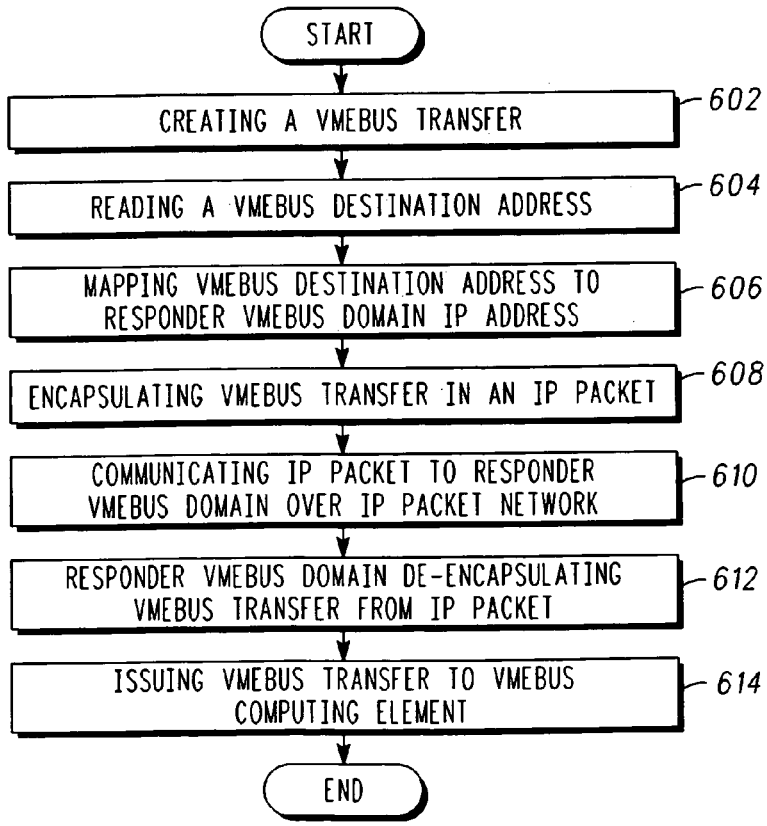
FIG. 6 illustrates a flow diagram of a method of the invention according to another embodiment of the invention.

FIG. 6 illustrates a flow diagram 600 of a method of the invention according to another embodiment of the invention. In an embodiment, FIG. 6 sets forth a method of communicating a VMEbus transfer from an initiator VMEbus domain, over an IP packet network, to a responder VMEbus domain. In step 602, a VMEbus transfer is created by a VMEbus computing element at initiator VMEbus domain. In step 604, a VMEbus-to-IP bridge can read VMEbus destination address from VMEbus transfer.

In step 606, IP-to-VMEbus domain map at initiator VMEbus domain can be used to map VMEbus destination address to a responder VMEbus domain IP address. In step 608, VMEbus transfer can be encapsulated in an IP packet. In step 610, IP packet can be communicated over IP packet network to responder VMEbus domain. In step 612, VMEbus transfer can be de-encapsulated from IP packet at VMEbus-to-IP bridge at responder VMEbus domain. In step 614, VMEbus transfer can be issued to a VMEbus computing element over a VMEbus network on responder VMEbus domain.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. In a computer network, a method of communicating a VMEbus transfer from an initiator VMEbus domain over an IP packet network to a responder VMEbus domain, comprising:
    the initiator VMEbus domain creating the VMEbus transfer;
    reading a VMEbus destination address of the VMEbus transfer;
    mapping the VMEbus destination address to a responder VMEbus domain IP address;
    encapsulating the VMEbus transfer in an IP packet;
    placing a VMEbus protocol flag in the IP packet; and
    communicating the IP packet to the responder VMEbus domain over the IP packet network.

2. A method of initializing a computer network, comprising:
    a VMEbus domain coupled to an IP packet network determining a VMEbus domain address map;
    the VMEbus domain requesting an IP address from a gateway controller of the IP packet network;
    the gateway controller assigning the IP address to the VMEbus domain;

the gateway controller building an IP-to-VMEbus domain map based on the VMEbus domain address map; and
the gateway controller communicating the IP-to-VMEbus domain map to the VMEbus domain.

3. The method of claim 2, further comprising:
the gateway controller determining the VMEbus domain; and
if the gateway controller determines the VMEbus domain, the gateway controller requesting the VMEbus domain address map in order to build the IP-to-VMEbus domain map.

4. The method of claim 2, wherein the VMEbus domain functions as an initiator VMEbus domain, the method further comprising:
the initiator VMEbus domain creating a VMEbus transfer having a VMEbus destination address;
mapping the VMEbus destination address to a responder VMEbus domain IP address;
encapsulating the VMEbus transfer in an IP packet; and
communicating the IP packet to the responder VMEbus domain over the IP packet network.

5. A method of initializing a computer network, comprising:
a plurality of VMEbus domains coupled to an IP packet network each determining one of a plurality of VMEbus domain address maps;
each of the plurality of VMEbus domains requesting an IP address from a gateway controller of the IP packet network;
the gateway controller assigning the IP address to each of the plurality of VMEbus domains;
the gateway controller building an IP-to-VMEbus domain map using the plurality of VMEbus domain address maps corresponding to each the plurality of VMEbus domains; and
the gateway controller communicating IP-to-VMEbus domain map to the plurality of VMEbus domains.

6. The method of claim 5, wherein one of the plurality of VMEbus domains functions as an initiator VMEbus domain and one of the plurality of VMEbus domains functions as a responder VMEbus domain, the method further comprising:
the initiator VMEbus domain creating a VMEbus domain transfer having a VMEbus destination address;
mapping the VMEbus destination address to a responder VMEbus domain IP address;
encapsulating the VMEbus transfer in an IP packet; and
communicating the IP packet to the responder VMEbus domain over the IP packet network.

7. A VMEbus domain, comprising:
a VMEbus network having at least one VMEbus computing element; and
a VMEbus-to-IP bridge coupled to the VMEbus network, wherein the VMEbus-to-IP bridge couples the VMEbus domain to an IP packet network, wherein the VMEbus-to-IP bridge is coupled to determine a VMEbus domain address map of the VMEbus network, wherein the VMEbus-to-IP bridge is coupled to request an IP address from a gateway controller of the IP packet network, wherein the VMEbus-to-IP bridge is coupled to map a VMEbus destination address to a responder VMEbus domain IP address, and wherein the VMEbus-to-IP bridge is coupled to encapsulate a VMEbus transfer generated from the VMEbus network into an IP packet.

8. The VMEbus domain of claim 7, wherein the VMEbus-to-IP bridge is coupled to communicate the IP packet to a responder VMEbus domain over the IP packet network.

9. In a VMEbus domain, a method of communicating a VMEbus transfer over an IP packet network, comprising:
creating the VMEbus transfer;
reading a VMEbus destination address of the VMEbus transfer;
mapping the VMEbus destination address to a responder VMEbus domain IP address;
encapsulating the VMEbus transfer in an IP packet;
placing a VMEbus protocol flag in the IP packet; and
communicating the IP packet to a responder VMEbus domain over the IP packet network.

10. In a VMEbus domain, a method of initializing an IP packet network, comprising:
determining a VMEbus domain address map;
requesting and receiving an IP address from a gateway controller of the IP packet network;
communicating the VMEbus domain address map to the gateway controller;
the gateway controller building an IP-to-VMEbus domain map based on the VMEbus domain address map; and
the gateway controller communicating the IP-to-VMEbus domain map to the VMEbus domain.

11. A computer-readable medium containing computer instructions for instructing a processor to perform a method of communicating a VMEbus transfer from an initiator VMEbus domain over an IP packet network to a responder VMEbus domain, the instructions comprising:
the initiator VMEbus domain creating the VMEbus transfer;
reading a VMEbus destination address of the VMEbus transfer;
mapping the VMEbus destination address to a responder VMEbus domain IP address;
encapsulating the VMEbus transfer in an IP packet;
placing a VMEbus protocol flag in the IP packet; and
communicating the IP packet to the responder VMEbus domain over the IP packet network.

12. A computer-readable medium containing computer instructions for instructing a processor to perform a method of communicating a VMEbus transfer from an initiator VMEbus domain over an IP packet network to a responder VMEbus domain, the instructions comprising:
the initiator VMEbus domain creating the VMEbus transfer;
reading a VMEbus destination address of the VMEbus transfer;
mapping the VMEbus destination address to a responder VMEbus domain IP address;
encapsulating the VMEbus transfer in an IP packet;
placing the responder VMEbus domain IP address into an IP header of the IP packet; and
communicating the IP packet to the responder VMEbus domain over the IP packet network.

13. A computer-readable medium containing computer instructions for instructing a processor to perform a method of initializing a computer network, the instructions comprising:
a VMEbus domain coupled to an IP packet network determining a VMEbus domain address map;
the VMEbus domain requesting an IP address from a gateway controller of the IP packet network;
the gateway controller assigning the IP address to the VMEbus domain;
the gateway controller building an IP-to-VMEbus domain map based on the VMEbus domain address map; and
the gateway controller communicating the IP-to-VMEbus domain map to the VMEbus domain.

14. The computer-readable medium of claim 13, further comprising:
   the gateway controller determining the VMEbus domain; and
   if the gateway controller determines the VMEbus domain, the gateway controller requesting the VMEbus domain address map in order to build the IP-to-VMEbus domain map.

15. The computer-readable medium of claim 13, wherein the VMEbus domain functions as an initiator VMEbus domain, the computer-readable medium instructions further comprising:
   the initiator VMEbus domain creating a VMEbus transfer having a VMEbus destination address;
   mapping the VMEbus destination address to a responder VMEbus domain IP address;
   encapsulating the VMEbus transfer in an IP packet; and
   communicating the IP packet to the responder VMEbus domain over the IP packet network.

16. A computer-readable medium containing computer instructions for instructing a processor to perform a method of initializing a computer network, the instructions comprising:
   a plurality of VMEbus domains coupled to an IP packet network each determining one of a plurality of VMEbus domain address maps;
   each of the plurality of VMEbus domains requesting an IP address from a gateway controller of the IP packet network;
   the gateway controller assigning the IP address to each of the plurality of VMEbus domains;
   the gateway controller building an IP-to-VMEbus domain map using the plurality of VMEbus domain address maps corresponding to each the plurality of VMEbus domains; and
   the gateway controller communicating IP-to-VMEbus domain map to the plurality of VMEbus domains.

17. The computer-readable medium of claim 16, wherein one of the plurality of VMEbus domains functions as an initiator VMEbus domain and one of the plurality of VMEbus domains functions as a responder VMEbus domain, the method further comprising:
   the initiator VMEbus domain creating a VMEbus domain transfer having a VMEbus destination address;
   mapping the VMEbus destination address to a responder VMEbus domain IP address;
   encapsulating the VMEbus transfer in an IP packet; and
   communicating the IP packet to the responder VMEbus domain over the IP packet network.

18. In a VMEbus domain, a computer-readable medium containing computer instructions for instructing a processor to perform a method of initializing an IP packet network, comprising:
   determining a VMEbus domain address map;
   requesting and receiving an IP address from a gateway controller of the IP packet network;
   communicating the VMEbus domain address map to the gateway controller;
   the gateway controller building an IP-to-VMEbus domain map based on the VMEbus domain address map; and
   the gateway controller communicating the IP-to-VMEbus domain map to the VMEbus domain.

* * * * *